Jan. 22, 1963  J. K. SPECHT  3,074,113
MOLDING APPARATUS
Filed Nov. 6, 1959
3 Sheets-Sheet 1

INVENTOR
John K. Specht
BY
Robert E. Strausser
ATTORNEY

Jan. 22, 1963 J. K. SPECHT 3,074,113
MOLDING APPARATUS
Filed Nov. 6, 1959 3 Sheets-Sheet 2
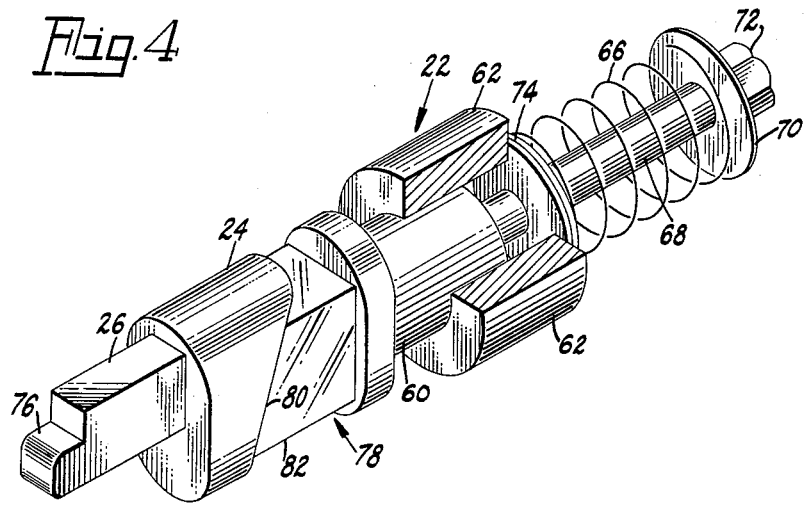
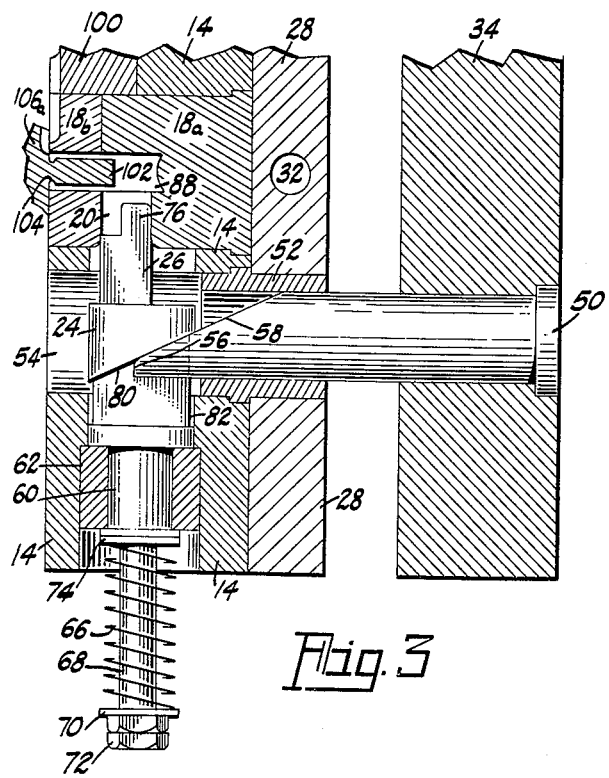
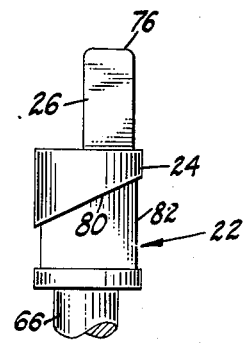
INVENTOR
*John K Specht*
BY
*Robert E. Strausser*
ATTORNEY Jan. 22, 1963

J. K. SPECHT 3,074,113

MOLDING APPARATUS

Filed Nov. 6, 1959

INVENTOR
John K. Specht
BY
Robert E. Strausser
ATTORNEY

United States Patent Office 3,074,113
Patented Jan. 22, 1963

3,074,113
MOLDING APPARATUS
John K. Specht, Warren, Pa., assignor to Sylvania Electric Products Inc., a corporation of Delaware
Filed Nov. 6, 1959, Ser. No. 851,281
2 Claims. (Cl. 18—42)

This invention relates to molding apparatus and more particularly to a mold useful in the production of complex plastic articles.

Modern merchandising methods require the production of articles which are readily adaptable to suit the desires of the consumer. In order to make the required product changes easily it is necessary to have readily changeable production tools. In the molding of many articles the expense entailed in changing the mold is so great that changes in the article design, one established, are discouraged. The resultant inflexibility of the product has been an incentive to those skilled in the art to attempt to develop new equipment to overcome the aforementioned difficulty. A typical article, much beset by this problem, is the push button utilized in the operation of radio receivers of the type found in automobiles. Since the only portion of the receiver which is normally visible to the consumer consists of the dials, control knobs and push buttons, desirable flexibility for styling changes requires a high degree of flexibility in the production apparatus. Heretofore production of push buttons had been limited to those situations wherein a large number of articles of a particular design could be produced without a change in molds. Accordingly, it is an object of this invention to increase the flexibility of production apparatus used in molding. It is another object of this invention to reduce the cost of the design changes encountered in adapting a particular product to consumer demand.

These and other objects and advantages of the invention are obtained in one aspect of the invention by the provision of a combination of a mold frame having a side core pin receiving passageway therein of a given size, an interchangeable cavity block positioned within the mold frame having a side core pin receiving passageway of another size aligned with the passageway in the mold frame, and an interchangeable side core pin adapted to slide in the passageway having a first portion of the given size in the mold frame passageway and a second portion of the other size extending into the passageway in the cavity block.

For a better understanding of the invention reference is made to the following description taken in conjunction with the accompanying drawings in which:

FIG. 3 is a sectional view of a portion of the lower half of the mold of FIG. 1 taken through a cavity along the line 3—3 of FIG. 1 with the mold in a partially open position;

FIG. 4 is a perspective view of a side core pin;

FIG. 5 is a fractional side view of another side core pin.

Figure 1:
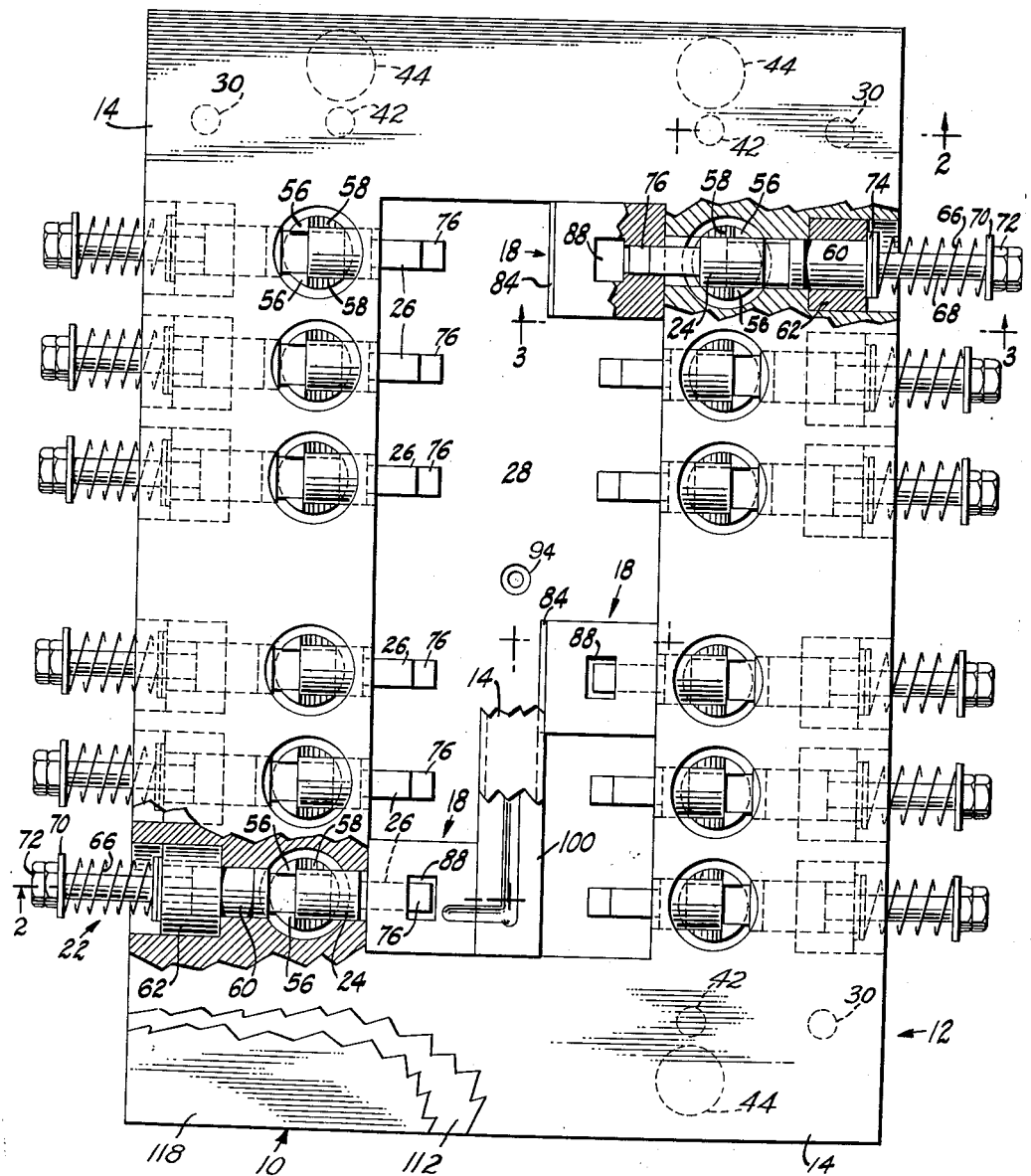
FIG. 1 is a plan view of the mold with a portion of the upper mold half shown in place and with parts broken away and other parts omitted in the interest of simplicity and clarity.
Figure 2:
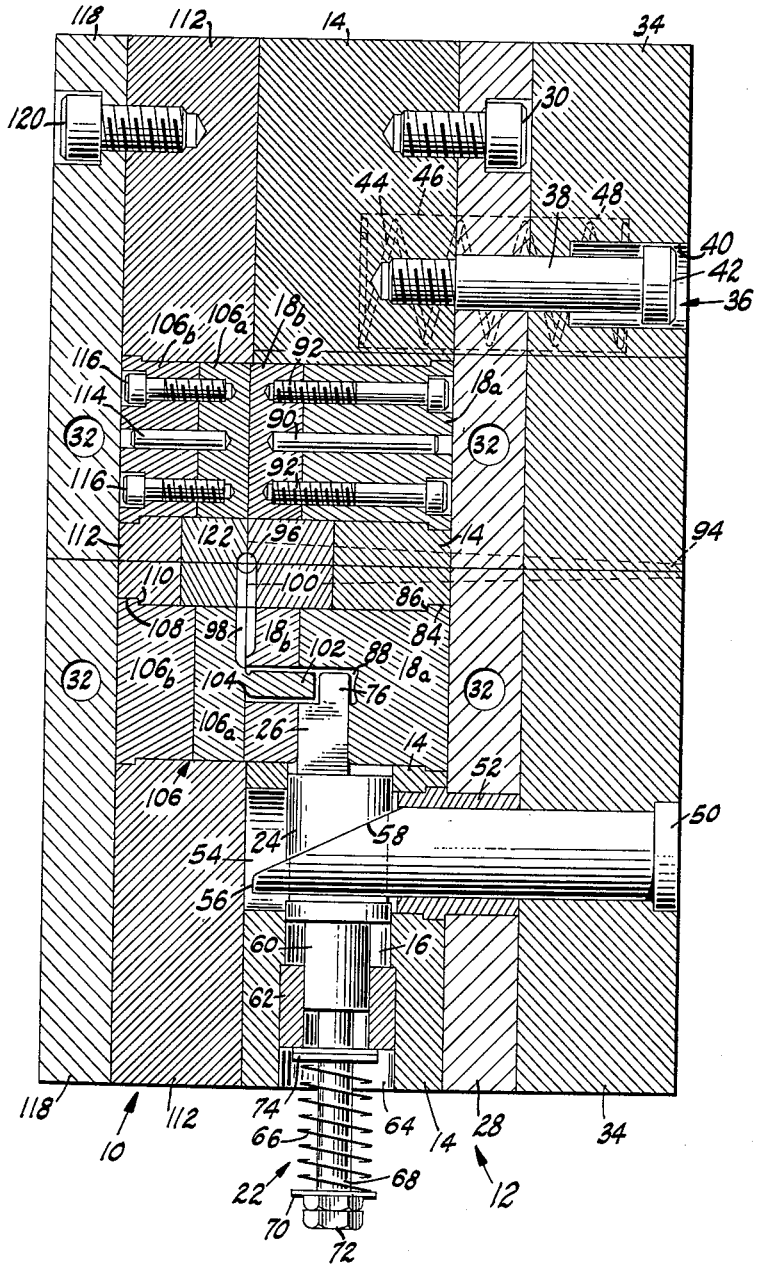
FIG. 2 is a sectional view of the mold of FIG. 1 taken along the line 2—2 of FIG. 1 with upper half of the mold also shown in detailed cross-section and with the entire mold shown in the closed position.

In one embodiment of the invention as shown in FIG. 2, the molding apparatus comprises an upper or fixed core mold half 10 and a lower or cavity mold half 12 which are adapted for mounting in an injection molding machine, not shown. The alignment between mold halves or section 10, 12 is produced by means conventional in the art such as by the use of leader pins, not shown. The lower mold section 12 includes a mold frame 14 having side core pin receiving passageways 16 therein of a given size, an interchangeable cavity block 18, positioned within the mold frame 14 having a side core pin receiving passageway 20 of another size aligned with the passageway 16 of the mold frame, and an interchangeable side core pin 22 adapted to slide in the passageways 16, 20 having a first portion 24 with a given size in the mold frame passageway 16 and a second portion 26 of the other size extending into the passageway 20 in the cavity block 18.

The mold frame 14 is secured to the cavity retainer plate 28 by bolts 30. Passages 32 for the mold coolant are provided in the retainer plate 28. Frame 14 and retainer plate 28 are joined to the backing plate 34 by stripper pins or bolts 36. Bolts 36 engage the frame 14 and are provided with a non-threaded shank 38 which extends into recesses 40 in the backing plate 34. Contact of the under side of the head 42 of each bolt 36 with the bottom of the recess 40 limits the relative movement between the joined parts. Separator spring 44 in a cavity formed by recesses 46, 48 in the frame 14 and backing plate 34, urges them apart when the mold is opened by action of the molding machine.

Bifurcated cam pin 50 which is fixed in the backing plate 34, passes through a bushing 52 mounted in the retainer plate 28 and mold frame 14, and terminates in a recess 54 in the frame 14. Each prong 56 of the pin 50 is provided with an inclined surface 58 whose function will be explained later.

Referring to FIGS. 2 and 4, the side core pin 22 is provided with a shank 60 which slides within a bushing 62 removably press-fit into a recess 64 in the frame 14. In FIG. 2 the side core pin is urged downwardly by a spring 66, mounted about a rod 68 affixed to the shank 60. The spring action is transmitted to the rod 68 by washer 70 retained in position by lock nuts 72 and washers 74 positioned against the bushing 62. The side core 76 is an extension of the second portion 26 of the core pin 22 and may be made co-extensive therewith as shown in FIG. 5. The elliptical cross-sectioned first portion 24 of the side core pin has a recess 78 formed therein having an inclined surface 80 adjacent a center rectangular cross-section portion 82 adapted to fit between the prongs 56 of the cam pin 50. The entire core pin assembly may be removed as a unit as shown in FIG. 4.

The cavity blocks 18 are each provided with a lip 84 which cooperates with a ledge 86 in the mold frame 14 to position the cavity block in the frame. The cavity 88 is a recess formed in the cavity block in the shape of the desired exterior configuration of the article to be molded therein. As shown in FIG. 2, the cavity block may be formed in two parts 18a, 18b, the two parts being joined by pins 90 and bolts 92.

The semi-liquid plastic material is delivered to the cavity 88 through a sprue 94, runner 96 and gate 98. The runner and gate are defined by grooves in the mating faces of the mold halves 10, 12 when the mold is closed and are formed, in part, in an insert 100 affixed to the frame 14 by means not shown.

The internal configuration of the article to be produced is determined by the shape of the fixed chamber forming core 102, provided with under cuts 104, which is a part of the core block 106. The core block may also be fabricated from two parts, 106a, 106b. One of the parts 106b is provided with a lip 108 which cooperates with a ledge 110 in the core retaining frame 112 to position the core in the frame. The two parts of the fixed core are joined by pins 114 and bolts 116. Core retaining plate 118 is affixed to the core frame 112 by screws 120 and coolant passages 32 are provided within the plate. Complementary portions of the runner 96 and gate 98 are formed in an insert 122 secured to the core frame 112 by means not shown.

The operation of the subject apparatus may best be understood if the description of the cycle of operation is begun with the mold mounted in an injection molding machine by conventional means and with the mold halves 10, 12 separated. While the mold halves 10, 12 are separated the mold frame and cavity retainer plate, which are joined by bolts 30, are separated from the backing plate 34 by the action of the springs 44 within the recesses 46, 48 of the mold frame and backing plate. At this time, the cam pin 50 is in its withdrawn position as shown in FIG. 3. When in this position, the side core pin 22 is retracted by the action of spring 66. Thus the core 76 is removed from the cavity 88 in the cavity block 18. Upon the initiation of the molding cycle the mold halves begin to approach one another along the leader pins, not shown. After the mold halves are brought into facing relation, continued advance of the backing plate 34 causes the separating spring 44 to be compressed. At this time, the inclined surfaces 58 on the cam pin 50 cooperate with the inclined surfaces 80 on side core pin 22 to advance the core pin to move the core 76 into the cavity 88. When the backing plate 34 contacts the cavity retainer plate 28 the side core 76 is fully extended into the cavity 88. In the next portion of the molding cycle the semi-liquid plastic material is introduced under pressure through the sprue 94, runner 96 and gate 98. The thermoplastic material is then allowed to set. When the material has hardened sufficiently the molding cycle causes the withdrawal of the backing plate 34 first while the mold frame 14 is held in contact with the fixed core frame 112, i.e., the mold half faces remain in contact by action of the springs 44. Retraction of the backing plate 34 causes the cam pin 50 to allow the side core pin 22 to be retracted by the spring 66, and the core 76 is withdrawn from the cavity 88 now occupied by the molded article. Continued movement of the backing plate after the side core has been withdrawn causes the mold halves 10, 12 to separate. The under cut 104 on the fixed core 102, which is embedded in the plastic material, now serves to retain the finished article on the core and withdraw it from the mold cavity 88. At the completion of the cycle the machine operator is able to pull the finished article from the core 102 due to the natural resilience of the thermoplastic material employed.

The mold frame 14 is universal in that it may be used repeatedly in the production of varying push button designs. The changeover from one size or type of push button to another is accomplished by replacing the cavity blocks 18 and side core pins 22. Each side core pin 22 and associated bushing 62 may be removed as a unit from the recess 64 in the mold frame 14 as shown in FIG. 4.

A considerable saving in tooling costs and time may be had since the same mold frame may be used in the production of various types of push buttons. A typical replacement side core pin 22 is shown in FIG. 5 wherein the core 76 is formed as a continuation of the second portion 26 of the side core pin. Although the first portion 24 of the core pin is shown with an elliptical cross-section, other configurations may be utilized in conjunction with complementary configuration passageways 16 in the mold frame 14. A considerable latitude of core position and size is possible since the first side core pin portion 24 remains fixed while the position of the second portion 26 on the first may be varied to produce the desired effect. While the second portion 26 is illustrated as being smaller than the first portion 24 of the side core pin 22 it is conceivable that in certain applications it may be advantageous for the second portion 26 to be larger than the first portion 24. In this situation the side core pins may be inserted through the interior of the mold frame and bushing 62 positioned after the pin 22 has been located.

With the above-identified apparatus it is possible to produce several varieties of push buttons utilizing the same mold frame. It is also possible to produce different article configurations in the same mold frame simultaneously.

Although several embodiments of the invention have been shown and described, it will be apparent to those skilled in the art that various changes and modifications may be made therein without departing from the scope of the invention as defined by the appended claims.

What is claimed is:

1. In a molding apparatus, the combination of a mold frame having a purality of aligned spaced side core pin receiving passageways therein of a given size;
   a plurality of interchangeable cavity blocks positioned within said mold frame
   each cavity block having a side core pin receiving passageway aligned with its associated core pin receiving passageway,
   an interchangeable core bearing side core pin slidable in each of said first mentioned passageways and means for sliding said core bearing side core pin in its associated passageway comprising a cam on said core pin, a cam pin engaging said cam, a backing plate fixedly supporting said cam pin, bolts threaded into said mold frame slidably supporting said backing plate and resilient means urging said backing plate away from the mold frame to release the core bearing side core pin from the pressure of the cam pin.

2. The structure of claim 1 combined with a core frame having a core block therein, said core block having a forming core thereon adapted to enter the cavity block, the forming core having under cut portions adjacent the core block to assist in retaining the molded article on the core and withdraw it from the cavity block on retraction of the core frame from the mold frame.

References Cited in the file of this patent

UNITED STATES PATENTS

| | | |
|---|---|---|
| 2,378,586 | Schultz | June 19, 1945 |
| 2,457,336 | Wilson | Dec. 28, 1948 |
| 2,558,026 | Wilson | June 26, 1951 |
| 2,718,032 | Harvey | Sept. 20, 1955 |
| 2,783,502 | Abplanalp | Mar. 5, 1957 |
| 2,834,988 | Morris | May 20, 1958 |
| 2,860,376 | Graves | Nov. 18, 1958 |

OTHER REFERENCES

Pearl: "Effective Mold Design," Plastics Engineering, April 1958, pages 111–115 (pp. 114–115 relied on).